July 28, 1936.  M. W. HARD ET AL  2,048,931
BRAKE MECHANISM
Filed June 26, 1931  2 Sheets-Sheet 1
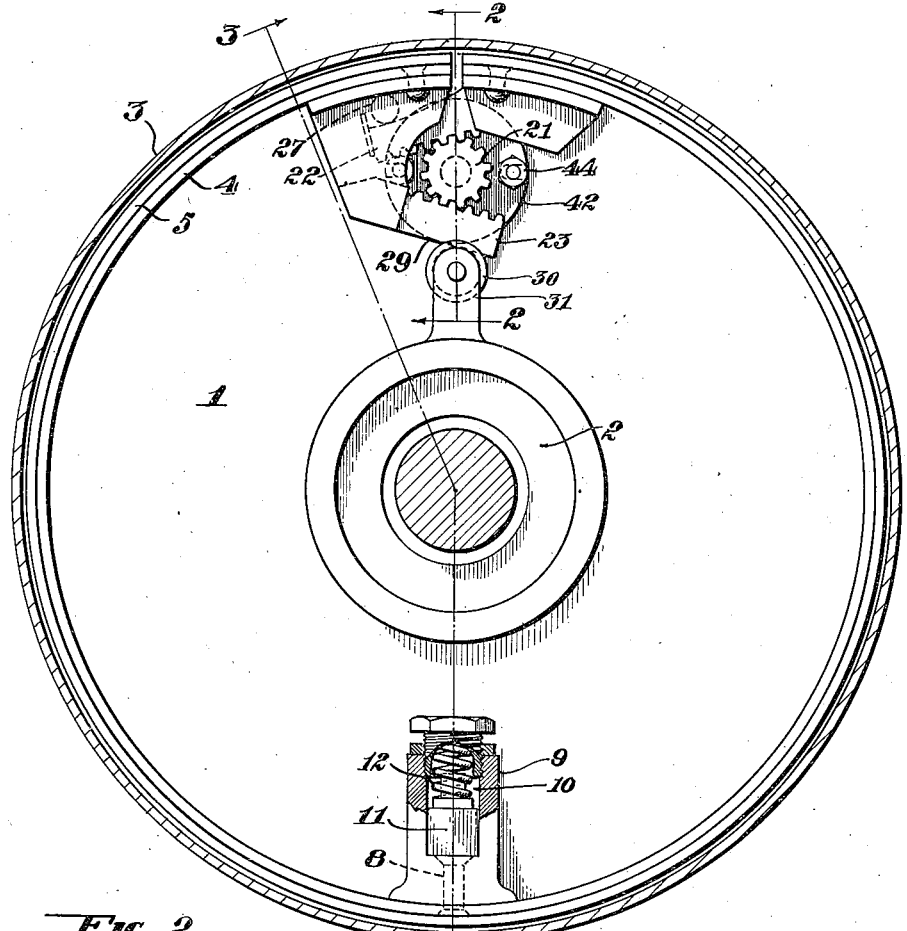
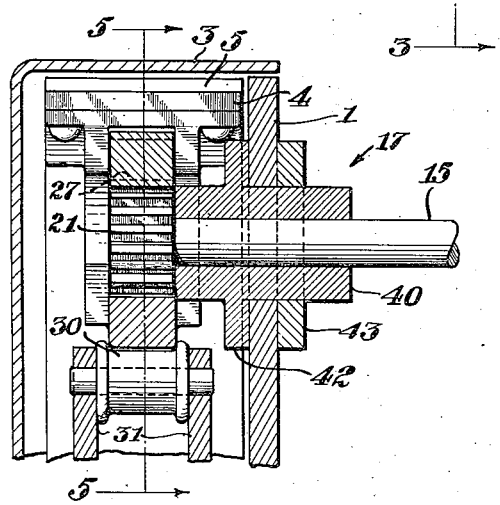
Inventors:
Merrill W. Hard and
Charles Peterson;
By
Attorney July 28, 1936.　　　M. W. HARD ET AL　　　2,048,931
BRAKE MECHANISM
Filed June 26, 1931　　　2 Sheets-Sheet 2
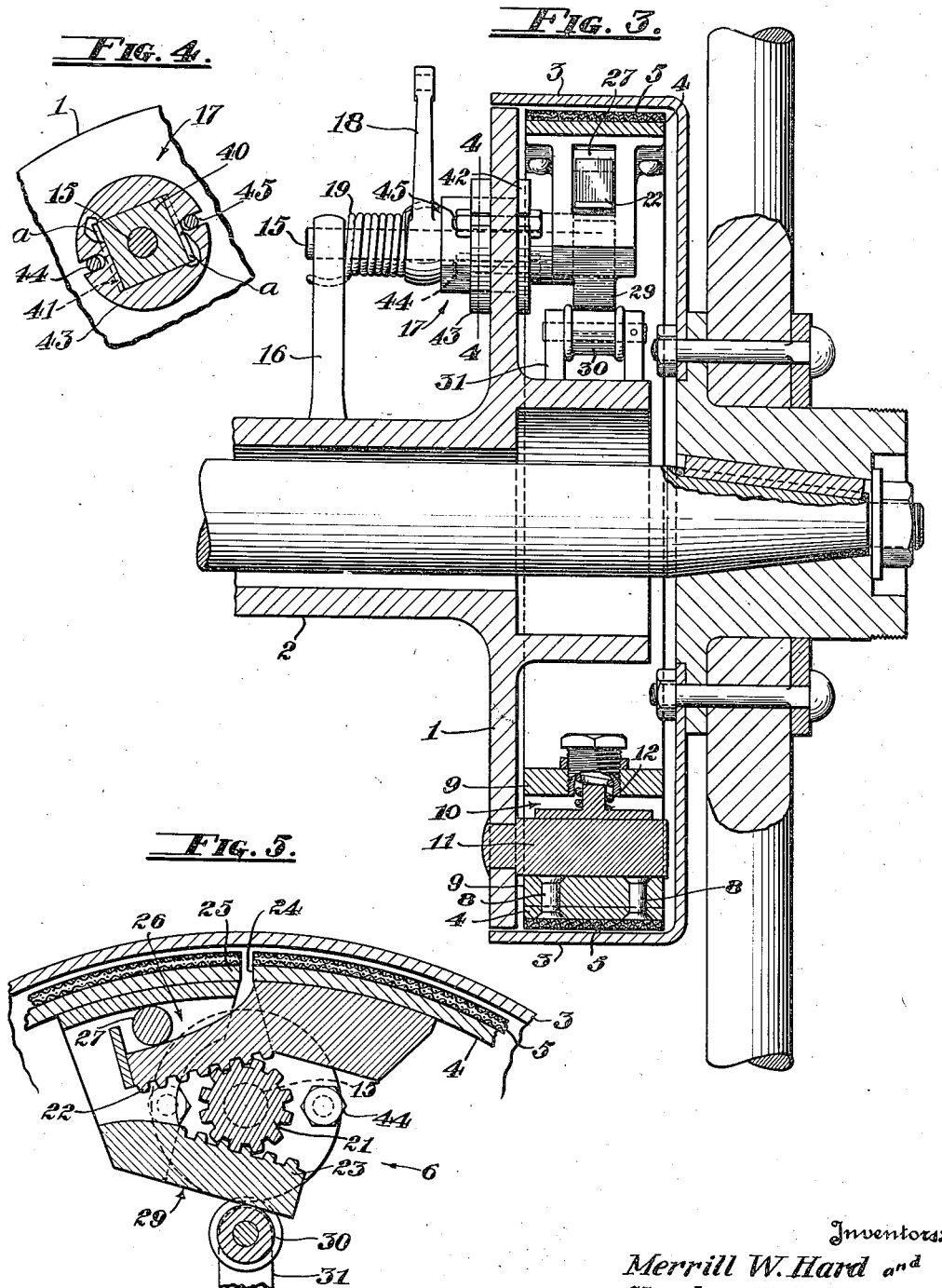

Patented July 28, 1936

2,048,931

UNITED STATES PATENT OFFICE 2,048,931

BRAKE MECHANISM

Merrill W. Hard, Los Angeles, and Charles Peterson, Pasadena, Calif., assignors to Tyle-Tye, Incorporated, Ltd., a corporation of California Application June 26, 1931, Serial No. 547,008

5 Claims. (Cl. 188—78)

This invention relates to vehicle brakes and more particularly to the internal or expanding band types of brakes as employed in motor vehicles.

An object of the invention is to provide a brake mechanism wherein an expansible band is evenly expanded and uniformly and simultaneously engaged throughout its circumference with the brake drum therefor in a particularly efficient manner whereby to insure a smooth, positive and reliable braking action without "grabbing", "chattering", uneven wear and distortion of the brake elements.

Another object is to provide brake mechanism of the character described wherein the brake elements may have relatively small friction or braking areas, yet provide a most pronounced and effective braking action with a minimum of manual effort on the part of the operator.

A further object is to provide brake mechanism of the character described wherein adjustment thereof is simplified and may be effected in a particularly expeditious yet accurate manner, by reason of a novel centering means forming a part of the mechanism.

Yet another object is to provide a particularly efficient actuating means for causing an expansion and contraction of the expansible braking element in such manner that an equal expanding force is applied to all points of the circumference of said element, whereby the latter is maintained in a true circle when thus expanded to engage the brake drum.

With the foregoing objects in view, together with such other objects and advantages as may subsequently appear, the invention resides in the parts and in the combination, construction and arrangement of parts hereinafter described and claimed and illustrated by way of example in the accompanying drawings, in which:

Figure 1 represents a vertical sectional view through the brake mechanism;

Figure 2 represents an enlarged section taken on the plane of line 2—2 of Figure 1;

Figure 3 is a sectional view taken on the plane of line 3—3 of Figure 1;

Figure 4 is a section taken on the plane of line 4—4 of Figure 3 with parts broken away;

Figure 5 is a section taken on the line 5—5 of Figure 2.

One embodiment of a motor vehicle brake constructed in accordance with this invention is as shown in detail in the accompanying drawings, generally comprised of a stationary plate like support 1 carried on the axle housing 2, a wheel carried brake drum 3, an open or split expansible band 4 within the drum and having the usual lining 5, and an actuating means 6 designed and arranged to evenly expand the ring in such manner that it will simultaneously engage the drum at all points of its circumference under a uniform pressure.

The band 4 at a point on its inner periphery diametrically opposed to the split or opening thereof has fixed thereto by a single transverse row of rivets 8 a slotted block 9 into the slot 10 of which a torque stud 11 extends. This stud is fixed to the stationary plate 1 and as is customary in the art prevents turning movement but permits bodily movement of the band necessary to expand and contract it into and out of engagement with the brake drum. An anti-rattling spring 12 may be fitted in the slot 10 to bear against the stud and block.

The actuating means 6 for the band is constructed and arranged so that the band which is normally entirely circumferentially spaced from the brake drum, may be evenly expanded to simultaneously engage at all points of its circumference with the brake drum under equal pressure at said points. In other words, the band is maintained in a true circle while being and when expanded into operative engagement with the drum.

It will now be apparent that owing to this manner of expanding the band, a smooth and powerful braking action may be provided with comparatively small friction areas and under relatively less band expanding power than when the band is unevenly expanded and engaged with the drum. This, it will be noted, is especially advantageous where the brakes are manually operated. However, the actuating means of this invention is designed to transmit relatively great power for expanding the band and with a minimum of manual effort, and therefore, in accordance with this invention the friction areas of the braking elements may be reduced to a highly desirable minimum while yet appreciably increasing the general efficiency of the brake.

To a great measure the aforesaid advantageous mode of expansion of the band is provided by transmitting from a fixed point in line with but to one side of the true center of the band and drum, band expanding forces which move the ends of the band (when arranged as shown in Figure 1) upward and outward against the brake drum, and move the other portions of the band equally and simultaneously with said ends into engagement with the drum. In other words, the lines of force or expanding pressure are transmitted radially from said fixed point and uniformly applied to all points of the circumference of said band without distortion of the band or of the drum out of true circular form.

Inasmuch as the band must be maintained as a true circle it is seen that the free ends thereof must be prevented from relative movement out of concentricity or alignment when being forced apart or when moving towards one another, and be controlled and limited as to upward movement towards the drum so that a definite ratio of upward or vertical to the lateral or outward movement is had. This is due to the fact that the circumferential spacing of the band from the drum is less than the spacing required between the ends of the band when the latter are moved apart as when expanding the band into operative positions.

Consequently the actuating means includes cam actions which definitely define the movements of said ends of the band and the expansion action of the entire band to the extent that all portions of the circumference of the band are brought simultaneously into engagement with the drum.

As here shown, the actuator comprises a jack shaft 15 supported by an axle housing carried bearing 16 and a centering bearing 17 carried by the support or plate 1, said shaft having a crank arm 18 for connection with the vehicle carried brake actuating rods and gear not shown. A torsion spring 19 is arranged on the shaft 15 to return the shaft and brake elements to normal position in the usual manner. Fixed on the shaft 15 within the drum is a pinion 21 arranged to one side but in line with the center of the band and drum, and directly beneath the split of the band. This pinion is disposed between and meshes with rack bars 22 and 23 which are rigidly fixed to the inner periphery of the band adjacent to the ends of the latter. The rack bar 22 is inclined downward and inward from the end 24 of the band and lies under the other end 25. Arranged in a groove 26 in the upper side of the rack bar 22 is an anti-friction roller 27 which bears upon the bottom of said groove and against the inner face of the band under the end 25 thereof.

The other rack bar 23 extends downward and inward from the end 25, being inclined oppositely to the rack bar 22, and the toothed portion thereof lies beneath the pinion. The under side of said toothed portion of said rack bar 23 presents an inclined face 29 which bears upon an anti-friction roller 30 carried on a stud 31 projecting upwardly from the axle housing 2. It is noted that the roller 30 and stud 31 are in line with the pinion and split end of the band and that as the rack bar 23 is moved to the left the inclined face 29 has a cam action against the roller such that the rack bar exerts in the direction of inclination of the bar an upward and outward thrust on the band. The rack bar 22 moving, of course, simultaneously with the rack bar 23 exerts a similar thrust on the band, in the direction of its inclination. Relative movement of the two ends 24 and 25 of the band, out of concentric alignment is prevented by the roller 27 engaging the under side of the band end 25 and by the engagement of the two rack bars upon opposite sides of the pinion. The extent and rate of upward movement of the band compared to the lateral movement is determined by the inclination or pitch of the inclined face 29 and the pitch of the bottom of the groove 26 in which roller 27 engages, it being noted that said bottom is pitched or inclined correspondingly to the face 29 but in the opposite direction.

It is now seen that when the pinion is rotated as when operating the brake, the two rack bars are forced from the fixed point defined by said pinion upward and outward in the direction of the respective ends of the band and that the latter is therefore evenly expanded in such manner that all portions thereof are under equal pressure transmitted radially from said fixed point. With such expansion and application of braking pressure the brake band engages the brake drum simultaneously throughout the entire circumference thereof, whereby to provide the advantages and eliminate the objections as hereinbefore noted. The upward and outward movement of the ends of the band under the action of the pinion 21 and rack bars 22 and 23 in the fixed path of travel defined by the rack bars as determined by the rollers 27 and in association with the pinion 21 will act to expand the band uniformly in all radial directions thus maintaining the band concentric with the inner periphery of the brake drum. During this action the stud 11 acts to hold the band against swinging sideways under wrapping action of the drum on the band being brought into contact with the drum. Upon release of the actuating mechanism the spring 19 rotates the shaft 15 whereby the pinion is turned and through the racks contacts the brake band.

The centering bearing 17 comprises a bushing 40 of rectangular cross section arranged to slide laterally in a rectilinear opening 41 in the plate 1, there being a flange 42 on the bushing arranged to engage one face of said plate. A clamp washer 43 is mounted on the bushing to engage the other side of the plate and is bolted in place by bolts and nuts 44 and 45 respectively. The upper and lower sides of the bushing are closely engaged with corresponding faces of the opening 41, whereas the other side faces of the bushing are spaced from the sides of the opening opposed thereto to afford clearance spaces as indicated at $a$ in Fig. 4 whereby the bushing, the shaft 15 thereon and the pinion are free to move laterally in either direction when the clamp washer 43 is loosened. To center the pinion and thereby properly adjust the brake, the clamp washer is loosened and the brake band is fully expanded.

It is now apparent that through the adjustment of the bearing the pinion will center itself when the band is expanded as aforesaid. While the band is thus expanded the clamp washer is tightened to hold the centered adjustment and the brake is then in proper adjustment, no other adjustment at the brake being necessary. If further adjustment is desired it is effected by lengthening or shortening the brake rods, not shown, in the usual manner.

It should be noted that the rack bars and other parts which are carried by the band are secured thereto by rivets placed on one line parallel to the axis of the band whereby the band is free to flex evenly and will not be distorted.

It is now apparent that the brake mechanism herewith shown and described will provide the objects and advantages aforesaid in a particularly efficacious manner.

It will be understood that while the brake is here shown as applied to a vehicle wheel, it is applicable for use wherever a brake or a clutch embodying the features of the invention are applicable, and that while the brake has been hereinbefore referred to as operated mechanically it may be actuated hydraulically or by any other suitable actuating means connecting with the shaft 15.

While we have herein shown and described a specific embodiment of the invention it is subject to modification as to the details of construction and the arrangement of parts and accordingly it comprehends such modifications and equivalent constructions as come within the meaning and scope of the appended claims.

We claim:

1. In brake mechanism, a stationary member, a rotary brake drum, a split brake band arranged interiorly for movement into and out of contact with said drum, means of adjustable connection between said band and said stationary member, rack bars fixed rigidly upon and points adjacent to the free ends of said band and extending inwardly and downwardly from said band in opposite inclined relation to one another, a drive pinion disposed at a fixed point on said stationary member and disposed between and in meshed engagement with said bars, one of said bars lying on opposite sides of the split of and engaged with said band, and an abutment on said stationary member radially in line with said fixed point and engaged with the other of said rack bars.

2. In brake mechanism, a stationary member, a rotary brake drum, a split brake band arranged interiorly for movement into and out of contact with said drum, means of adjustable connection between said band and said stationary member, rack bars fixed rigidly upon and points adjacent to the free ends of said band and extending inwardly and downwardly from said band in opposite inclined relation to one another, a drive pinion disposed at a fixed point on said stationary member and disposed between and in meshed engagement with said bars, one of said bars extending on both sides of the split of the band, an anti-friction roller located between said bar and band, and an anti-friction roller fixed to said stationary member and abutting the other of said rack bars.

3. In brake mechanism, a stationary member, a rotary brake drum, a split brake band arranged interiorly for movement into and out of contact with said drum, means of adjustable connection between said band and said stationary member, rack bars fixed rigidly upon and points adjacent to the free ends of said band and extending inwardly and downwardly from said band in opposite inclined relation to one another, a drive pinion disposed at a fixed point on said stationary member and disposed between and in meshed engagement with said bar, one of said bars extending on both sides of the split of the band, an anti-friction roller located between said bar and band.

4. In a brake mechanism, a stationary member, a rotary brake drum, a split brake band arranged interiorly of said drum for movement into and out of contact with said drum, a means of connection between said band and stationary member for holding said band against rotation, rack bars affixed upon and adjacent to the free ends of said band and extending inwardly and downwardly from said band in opposite inclined relation to each other, a drive pinion disposed at a fixed point on said stationary member and arranged between said bars in meshed engagement therewith, and means for guiding longitudinal movement of said rack bars on outwardly diverging substantially straight paths of travel.

5. In a brake mechanism, a stationary member, a rotary brake drum, a split brake band arranged interiorly of said drum for movement into and out of contact with said drum, means for guiding the intermediate portion of said band to move radially toward and away from said drum, straight rack bars affixed to the free ends of said band extending inwardly and downwardly in angular relation to each other: a drive pinion interposed between and meshing with said bars, and means for confining movement of said bars to straight paths of travel whereby on advancing said bars longitudinally the ends of said brake band will be caused to move in a combined upward and outward direction.

MERRILL W. HARD.
CHARLES PETERSON.